United States Patent Office 2,891,673
Patented June 23, 1959

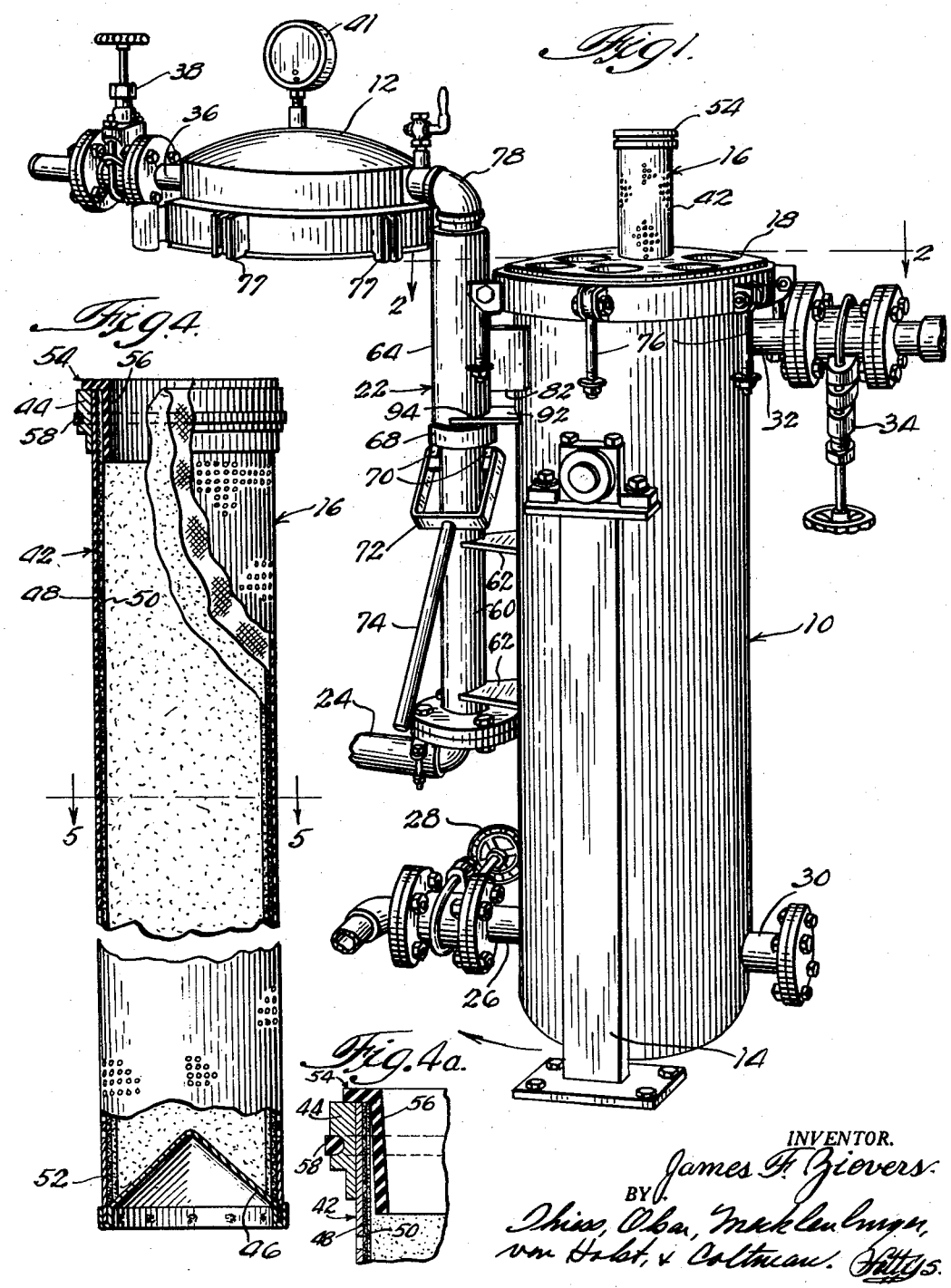

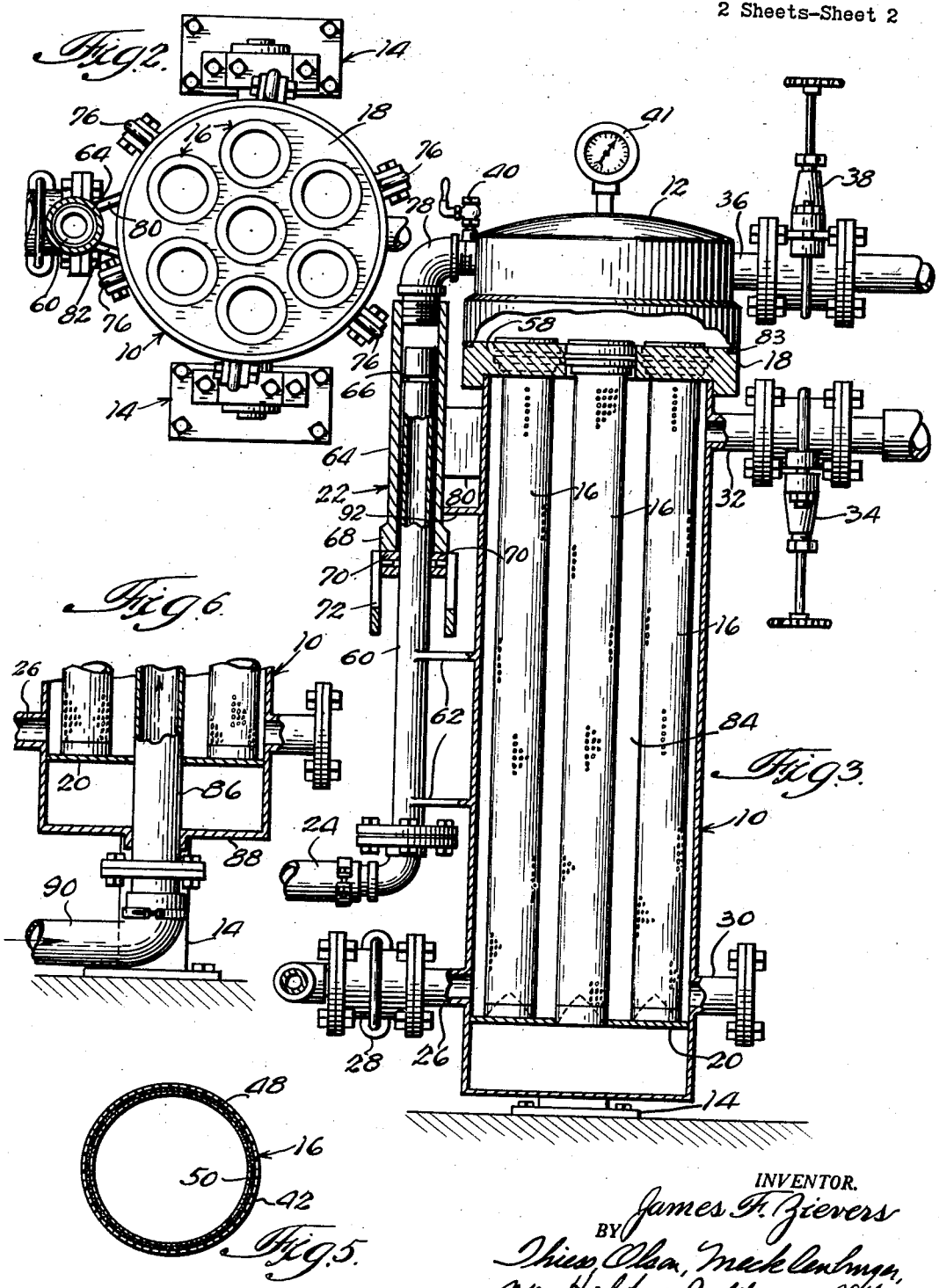

2,891,673
FILTERING APPARATUS

James F. Zievers, Skokie, Ill., assignor to Industrial Filter & Pump Mfg. Co., Chicago, Ill., a corporation of Illinois Application December 6, 1955, Serial No. 551,259

1 Claim. (Cl. 210—323)

This invention relates to apparatus for filtering liquids and more particularly to filtering apparatus wherein the filtering media may be readily removed and replaced.

In many filtering applications, whether industrial, municipal or domestic, it is desirable that the filter apparatus operates substantially continuously and that the time required for cleaning and removal of filter media be reduced to a minimum. It is an object of this invention to provide an improved filtering apparatus of this character.

It is another object of this invention to provide improved filter apparatus especially useful for scavenger and trap work.

It is a further object of this invention to provide a filtering apparatus comprising removable and disposable filter media which may be quickly removed and replaced without disassembling the entire apparatus.

It is a still further object of this invention to provide a filtering apparatus having a unique opening or cover mechanism which assures both a permanent seal during operation and ready and convenient opening to permit access to and removal of the disposable filter media.

It is a still further object of this invention to provide a filter apparatus which may be operated in a vertical, horizontal or intermediate position as the intended use thereof may warrant.

It is a still further object of this invention to provide an improved filtering apparatus which is both sturdy in construction and economical in its manufacture and operation.

This invention together with further objects and advantages thereof may best be understood by reference to the following description taken in connection with the accompanying drawings, and its scope will be pointed out in the appended claim.

In the drawings, in which like parts are designated by like reference numbers:

Figure 1 is a perspective view of the filter apparatus of one embodiment of the invention shown in vertical position with the cover in open position;

Fig. 2 is a plan view of certain parts of the apparatus taken in the direction of the arrows 2—2 of Fig. 1;

Fig. 3 is a vertical partial sectional view of the device shown in Fig. 1 and showing the cover of the apparatus in closed position;

Fig. 4 is a vertical partial sectional view of certain parts of the invention;

Fig. 4a is an enlarged fragmentary view of certain parts of the invention shown in Fig. 4;

Fig. 5 is a sectional view taken in the direction of arrows 5—5 of Fig. 4; and

Fig. 6 is a partial vertical sectional view of a modified form of certain parts of the invention shown in Fig. 3.

A filtering apparatus constructed in accordance with the present invention is well adapted to many industrial and municipal applications and may also be of practical use in domestic applications. It is ideally recommended for the filtering of corrosive or noncorrosive liquids containing a low percentage of solids and is also recommended as a trap filter connected in series with other clarification equipment for the removal of fines not removable by prior clarification. It is also advantageous for filtering the run-off when cleaning or servicing larger filters. It has been found to be more economical than the use of a scavenger plate of equivalent size for this purpose. The use of the filter apparatus of the invention is further recommended where it is desirable to recover the solids removed from the liquid being filtered in dry form.

According to one embodiment of this invention, there is provided a filter apparatus comprising a substantially sealed cylindrical chamber including a cover, a plurality of removable tubular elements disposed longitudinally within said chamber, tubular filter liners, which may or may not be coated, removably disposed within each of said filter elements and embracing the walls thereof, an inlet for admitting liquid to be filtered into said chamber under pressure, an outlet from said chamber for filtered liquid, and means for moving said cover whereby said filter elements and liners may be removed from said chamber.

Referring particularly to Fig. 1, there is provided a cylindrical pressure chamber 10 having a sealable cover 12 thereon shown in open position. The chamber 10 is pivotally supported on a trunnion apparatus 14 which permits the chamber 10 to be moved in a vertical plane whereby the filter apparatus may be operated in a vertical position (as shown in Fig. 1) or in horizontal or intermediate positions (not shown) after pivotal movement in the direction of the arrow. As shown in Figs. 1 and 3, a plurality of filter elements 16 are longitudinally disposed within the chamber 10 and are supported therein by upper and lower tube sheets 18 and 20, respectively.

The inlet for introducing liquid to be filtered into the chamber 10 comprises a telescopic pipe connection 22 (which will be described with more particularity hereinafter) which introduces liquid from the inlet hose 24 through the interior of the cover 12, which serves as a manifold for the distribution of the unfiltered liquid into the open upper ends of the filter media 16. An outlet pipe 26 including a valve 28 is provided near the bottom of the chamber 10 above the lower tube sheet 20 for the removal of the filtered liquid which has passed outwardly through the walls of the filter media 16. An additional pipe connection 30 may also be provided on the opposite side of the chamber 10 to serve as an auxiliary drain or filtered liquid outlet. Pipe connections 26 and 30 function as filtered liquid outlets when the apparatus is operated with chamber 10 in a vertical or substantially vertical position (as shown in Fig. 3).

When the filtering apparatus is operated with the chamber 10 in a horizontal or substantially horizontal position, the pipe 32 including the valve 34 serves as an outlet for filtered liquid, as may pipe 30. A pipe 36 including a valve 38 is also provided to serve as an auxiliary drain for unfiltered liquid from the interior of the cover 12 when the apparatus is operated in a horizontal position. After filtering with the chamber 10 in a vertical position, the chamber may be tilted so that the pipe 36 may be also used to drain off the unfiltered contents of the filter media prior to opening the cover 12. The pipe 36 may also be used for the introduction of air into the chamber when desired for drying the cake prior to removal from the chamber for disposal or recovery. A valve 40 may also be provided in the unfiltered liquid inlet pipe for the purpose of bleeding air when desired. A pressure gauge 41 may be provided so as to maintain the desired pressure within the chamber 10.

With particular reference to Figs. 4, 4a and 5, the filter media 16 comprises an outer cylindrical element 42 which may be made of metal or other suitable strong material. Filter element 42 is provided with an annular flange member or collar 44 at the open upper end thereof and a closed dome-shaped bottom 46. The inner surface of the filter element 42 is smoothly cylindrical and is perforated throughout except at the upper and lower annular portions thereof. By reason of the perforations in the filter element 42, this element may function by itself as a suitable filter and the size of the perforations may be selected for the intended use.

For fine filtering, however, it may be desirable to provide in addition a tubular filter liner 48 which may be made of paper, nonwoven fabric, felt, or other suitable material, which may be coated with a diatomaceous earth 50 if desired. Whether coated or uncoated, the filter liner 48 may be formed from a sheet such as paper and rolled into a tubular shape slightly shorter than the length of the filter element 42. The liner 48 so formed may be readily inserted into the filter element 42 through the open top thereof. The dome-shaped bottom 46 of the filter element 42 serves to guide the lower portion 52 of the liner into close circumferential engagement with the smooth interior surface of the filter element 42. By reason of a sealing ring 54, which is provided with a radially inwardly tapered portion 56 and which is inserted into the upper end of the liner 48, the upper portion of the liner is caused to snugly embrace the interior wall of the filter element 42. By reason of the smooth unperforated upper and lower portions of the filter elements 42, an effective seal is provided between the adjacent upper and lower portions of the liners 48. The central wall portions of the liners are effectively held against the surrounding central portions of the filter elements 42 by the pressure of the liquid being filtered therethrough.

As shown in Figs. 1 and 3, the filter media 16 are supported longitudinally in the chamber 10 between the upper tube sheet 18 and lower tube sheet 20. The lower tube sheet 20 is solid and may serve as a sealing bottom wall of the pressure chamber 10. The upper tube sheet 18 is provided with a plurality of openings for receiving and removably securing the upper ends of the filter media 16. O-ring seals 58 are provided in annular grooves on the collars 44 to effectively seal the upper ends of the filter media to prevent unfiltered liquid from by-passing the filter media.

As shown in Fig. 1, the entire filter media 16 may be readily removed for cleaning or replacement when the cover 12 is opened. It should also be noted that the filter liner 48 may be readily removed from the filter element 42 without removal of the filter element from the chamber 10 simply by withdrawal of the tapered sealing ring 54. Prior to removal of the filter liner 48 or the entire filter media 16, it may be desirable to introduce air through the pipe 36 so as to dry the cake which has been built up on the filter media.

As shown in Figs. 1 and 3, it will be noted that the unfiltered liquid is introduced from the hose 24 into the interior of the cover 12 through an intermediate telescopic pipe connection 22. This telescopic pipe connection comprises a lower inner pipe 60 secured to the chamber 10 by brackets 62, and an upper or outer pipe member 64 which encompasses the upper portion of the inner pipe 60 and which may be caused to reciprocate upwardly or downwardly like a sleeve on the lower pipe member. A sealing ring 66 is provided on the upper end of the inner pipe member 60 so as to prevent any leakage of the unfiltered liquid which may be introduced into the apparatus under pressure. The reciprocal movement of the upper pipe member 64 is effected by providing a shoulder 68 at the lower end of the pipe member 64, the shoulder 68 being supported on a pair of cam members 70 which are diametrically opposed and pivotally secured to the inner pipe member 60 and which may be rotated by means of the upward or downward movement of the yoke or crank member 72. Thus, after the clamps 76 have been disengaged from the cooperating lugs 77 on the cover 12, by moving the handle 74 of the crank member 72 downwardly in the direction of the arrow (Fig. 1), the cams 70 rotate so as to urge the upper pipe member 64 upwardly a sufficient distance to permit the cover 12 to be swung away from the top of the chamber 10 to permit access thereto.

It will be noted that the unfiltered liquid is introduced into the interior of the cover 12 through an elbow 78. The elbow 78 and the reciprocating pipe connection 22 and the parts thereof are of sufficient strength to support the cover 12 when in an open position. By means of the telescopic connection between the upper pipe member 64 and lower pipe member 60, the upper pipe member 64 is free to rotate with respect to the lower pipe member 60 so that when the upper pipe member 64 has been raised, as hereinbefore described, it may be rotated so as to permit swinging of the cover 12 away from the top of the chamber 10. An arm 92 (Fig. 1) secured to the chamber 10 and having an arcuate recess 94 at the outer end thereof for sliding engagement with pipe 64, serves to provide support for the cover 12 when in open position.

A pair of arms 80 and 82 may be provided on the upper pipe member 64 so as to limit or check the rotation of the pipe member 64 when the outer ends of either of the arms 80 or 82 contact the chamber 10. One of these arms may be used to check the return swing of the cover 12 so as to facilitate realignment of the cover with the top of the chamber 10 prior to lowering of the cover to a closed position (Fig. 3) by raising the handle 74. To effectively seal the apparatus when the cover is closed, a suitable gasket 83 is provided.

In the filtering operation with the cover 12 closed, unfiltered liquid is introduced into the top of the cover as hereinbefore described and from thence is distributed into each of the filter media 16. The filtered liquid passing outwardly radially through the filtered media accumulates in the surrounding interior 84 of the pressure chamber 10 and is run off through the outlets 26 and 30 as hereinbefore described. Solids present in the liquid are retained by and form a cake on the filter media. When it becomes desirable to remove the cake or the filter media for the purpose of disposal or replacement, the entire filter media 16, or each of them in their entirety, or only the filter liners 48 thereof, may be readily removed from the pressure chamber as hereinbefore described without otherwise dismantling the apparatus.

A modified form of the invention is shown in Fig. 6 and has been found especially satisfactory for filtering apparatus of the general type described hereinabove where filters of large capacity or having large pressure chambers are required. It has been found desirable in such cases, for example, to provide additional strength and rigidity to the pressure chamber 10 by providing a centrally disposed tubular member 86 (Fig. 6) disposed longitudinally in the chamber 10, centrally located therein and extending from the upper tube sheet 18 through the bottom 88 of the chamber 10. This tubular member 86 is rigidly secured to the upper and lower tube sheets 18 and 20 and to the bottom 88 of the chamber thereby adding to the rigidity of the chamber. Tubular member 86 thus takes the place of the centrally disposed and less rigid filter media 16 of the previous embodiment. As shown in Fig. 6, an unfiltered liquid inlet pipe or hose 90 may be secured to the bottom of pipe 86 so as to introduce the unfiltered liquid into the chamber 10 upwardly through the pipe 86 and out of the top thereof into the upper section of the chamber under the cover 12 and thence into the surrounding filter media 16 as in the previous embodiment. The remainder of the construction and the operation of this embodiment of this invention is substantially the same as that of the earlier embodiment with the exception that in this embodiment the introduction of unfiltered liquid through the pipe connection 22 is obviously not necessary.

It will thus be seen that the embodiments of the invention hereinbefore described provide a filtering apparatus which is believed to be more practical and economical in many applications than any which has heretofore been known. The apparatus described is economical in the manufacture and operation thereof and also provides a convenient construction for the replacement or disposal of the filtering media thereof.

While particular embodiments of the invention have been shown, it will be understood, of course, that the invention is not limited thereto since many modifications may be made and it is therefore contemplated to cover by the appended claims any such modifications as may fall within the true spirit and scope of the invention.

The invention having been thus described, what is claimed and desired by Letters Patent is:

A filter element for filtering liquids comprising a tubular wall having a smooth interior surface, said element being open at one end to admit liquid to be filtered and being closed at the opposite end thereof, said wall having perforations therethrough except at the annular end portions thereof for discharging filtered liquid, an annular flange around the outside of said wall at the open end of said element, a removable tubular filter liner disposed longitudinally in the interior of said element and capable of being urged into embracing relationship with the interior surface of said wall, and guide means within said element for urging the annular end portions of said liner into embracing relationship with the interior surface of the unperforated annular end portions of said wall whereby to provide an effective seal between the opposed unperforated end portions of said wall and said liner to prevent the bypass of unfiltered liquid therebetween, said guide means comprising two tapered members extending axially into said element and said liner from opposite ends thereof to engage the interior of the annular end portions of said liner, one of said tapered members comprising the closure at one end of said element and the other of said tapered members comprising an annular sealing ring partially inserted into the open end of said element, said sealing ring having a radially disposed annular portion overlying said flange and a radially inwardly tapered annular portion extending into said element and said liner.

References Cited in the file of this patent

UNITED STATES PATENTS

| | | |
|---|---|---|
| 776,222 | Derham | Nov. 29, 1904 |
| 788,231 | Acker | Apr. 25, 1905 |
| 1,079,359 | Oppenheimer | Nov. 25, 1913 |
| 1,810,965 | Hopkins | June 23, 1931 |
| 2,108,087 | Thayer | Feb. 15, 1938 |
| 2,423,909 | Smith | July 15, 1947 |
| 2,475,561 | Cooperider et al. | July 5, 1949 |
| 2,625,273 | Schuller | Jan. 13, 1953 |